United States Patent [19]

Cowan et al.

[11] Patent Number: 5,311,944

[45] Date of Patent: May 17, 1994

[54] BLAST FURNACE SLAG BLEND IN CEMENT

[75] Inventors: Kenneth M. Cowan, Sugar Land; Arthur H. Hale, Houston, both of Tex.

[73] Assignee: Shell Oil Company, Houston, Tex.

[21] Appl. No.: 964,972

[22] Filed: Oct. 22, 1992

[51] Int. Cl.$^5$ .................. E21B 33/14; C09K 7/04
[52] U.S. Cl. ................... 166/292; 166/300; 175/64; 175/65; 106/789; 507/140
[58] Field of Search .................. 166/292, 300; 175/64, 175/65, 72; 507/140; 106/789, 790

[56] References Cited

U.S. PATENT DOCUMENTS

| | | |
|---|---|---|
| 2,122,236 | 6/1938 | Nichols et al. ............... 507/140 |
| 2,336,723 | 12/1943 | Drummond . |
| 2,649,160 | 8/1953 | Williams et al. . |
| 2,776,112 | 1/1957 | Ilfrey et al. ............... 175/64 X |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,961,044 | 11/1960 | Shell . |
| 2,983,353 | 3/1960 | Vorenkamp . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,921,717 | 11/1975 | Danjushevsky et al. ............ 166/292 |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Per Baardsen . |
| 4,252,471 | 2/1981 | Straub . |
| 4,335,980 | 6/1982 | DePriester . |
| 4,338,134 | 7/1982 | Graf zu Munster . |

(List continued on next page.)

FOREIGN PATENT DOCUMENTS

| | | |
|---|---|---|
| 85144069/24 | 7/1983 | Japan . |
| 61-48454 | 3/1986 | Japan . |
| 833704 | 6/1981 | U.S.S.R. . |

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.

"Mud Disposal: An Industry Perspective", Hanson et al, Drilling, May 1986, pp. 16-21.

"Waste Minimization Program Can Reduce Drilling Costs", Hall et al, Oryx Energy Co., Houston, Tex., Oil & Gas Journal, Jul. 1, 1991, pp. 43-46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1992) by Cowan et al.

"Quantitative Interpretation of X-Ray Diffraction Patterns of Mixtures.I.Matrix-Flushing Method for Quantitative Multicomponent Analysis" by Frank H. Chung, J. Appl. Cryst. (1974) 7, pp. 519-525.

Primary Examiner—George A. Suchfield

[57] ABSTRACT

A cementitious slurry comprising microfine ground blast furnace slag and normally ground blast furnace slag. A microfine ground blast furnace slag is made of composition having a blaine specific surface area between 8,000 and 20,000 cm$^2$/g. By normally ground is meant slag compositions having a surface area of less than 8,000 cm$^2$/g. Such cementitious compositions have utility in construction, road building, and cementing wellbores.

14 Claims, No Drawings

U.S. PATENT DOCUMENTS

| | | | |
|---|---|---|---|
| 4,425,055 | 1/1984 | Tiedemann . | |
| 4,427,320 | 1/1984 | Bhula . | |
| 4,450,009 | 5/1984 | Childs et al. . | |
| 4,460,292 | 7/1984 | Durham et al. . | |
| 4,518,508 | 5/1985 | Conner | 210/751 |
| 4,643,617 | 2/1987 | Kanno et al. | 405/222 |
| 4,664,843 | 5/1987 | Burba, III et al. . | |
| 4,668,128 | 5/1987 | Hartley et al. . | |
| 4,674,574 | 6/1987 | Savoly et al. | 166/293 |
| 4,690,589 | 9/1987 | Owa | 405/263 |
| 4,692,065 | 9/1987 | Suzuki et al. | 405/211 |
| 4,720,214 | 1/1988 | Brasted et al. . | |
| 4,746,245 | 5/1988 | Mork | 405/224 |
| 4,760,882 | 8/1988 | Novak . | |
| 4,761,183 | 8/1988 | Clarke . | |
| 4,790,954 | 12/1988 | Burba, III et al. . | |
| 4,880,468 | 11/1989 | Bowlin et al. . | |
| 4,897,119 | 1/1990 | Clarke . | |
| 4,913,585 | 4/1990 | Thompson et al. . | |
| 4,942,929 | 7/1990 | Malachosky et al. . | |
| 4,991,668 | 2/1991 | Rehm et al. . | |
| 5,016,711 | 5/1991 | Cowan . | |
| 5,020,598 | 6/1991 | Cowan et al. | 166/293 |
| 5,026,215 | 6/1991 | Clarke . | |
| 5,058,679 | 10/1991 | Hale et al. . | |
| 5,082,499 | 1/1992 | Shen | 106/735 |
| 5,086,850 | 2/1992 | Harris et al. . | |
| 5,105,885 | 4/1929 | Bray et al. . | |
| 5,106,423 | 4/1992 | Clarke . | |
| 5,121,795 | 6/1992 | Ewert et al. . | |
| 5,123,487 | 6/1992 | Harris et al. . | |
| 5,125,455 | 6/1992 | Harris et al. . | |
| 5,127,473 | 7/1992 | Harris et al. . | |
| 5,133,806 | 7/1992 | Sakamoto et al. | 106/811 |
| 5,147,565 | 9/1992 | Bour et al. | 252/8.551 |

BLAST FURNACE SLAG BLEND IN CEMENT

BACKGROUND OF THE INVENTION

The present invention relates to slag cement, and more particularly to drilling and cementing boreholes.

Grouting with fine ground slag cement is known. Such grouting is disclosed in Clarke, U.S. Pat. No. 4,761,183 (Aug. 2, 1988) and Clarke, U.S. Pat. No. 5,106,423 (Apr. 21, 1992). The '423 patent also discloses petroleum as an area of utility for the cementitious slurries described in the invention.

The teaching of Clarke follows conventional wisdom that the advantages flowing from the use finely ground hydraulic materials can justify the grinding expense. However, the difficulty of such grinding is quite great. The particle sizes of even normally ground hydraulic materials are generally in the micron range. Relative to slag broadly, Clarke '423 teaches that less than 3%, preferably less than 1.5%, and most preferably, no particles are larger than 7.8 microns in diameter should be present.

SUMMARY OF THE INVENTION

It is an object of this invention to achieve the benefits of finely ground hydraulic material without the expense normally associated with grinding large volumes of hydraulic material to a very small particle size; and A further object of this invention is to provided improved cementitious compositions.

According to this invention about 5–75 wt % of microfine ground blast furnace slag is combined with about 25–95 wt % of normally ground blast furnace slag and the resulting blend combined with water and an activator system to produce a cementitious slurry.

DETAILED DESCRIPTION OF THE INVENTION

In accordance with this invention, a portion, generally a minor portion of the total blast furnace slag being used is ground to a microfine condition and the resulting powder is mixed with normally mixed blast furnace slag. The resulting blend is combined with water and an activator system to give a cementitious slurry. Broadly, 5–75 wt % microfine ground blast furnace slag can be combined with 95–25 wt % normally ground blast furnace slag. Generally however, only a minority, i.e. 5–48 wt % of the slag needs to be ground to the microfine particle size. Preferably 5–25 wt % is ground to the microfine particle size and the remainder ground in a normal way.

Even with the less severe conditions that are used to produce normally ground blast furnace slag there can be some particles in within the microfine range. Thus, including any microfine size particles in the ultimate blend coming from the normally ground component, the ratios of ingredients broadly are 6–76 wt % of the microfine ground material. Generally, the ultimate blend will have 6–49 wt % of the microfine ground material, preferably 6–26 wt % microfine based on the weight of the total blend. Thus, 94–24 wt %, generally 94–51 wt %, preferably 94–74 wt % is normally ground.

Definitions

As used herein the term 'microfine' is used to designate a blast furnace slag ground more finely than the normally ground slag. Stated in Blaine surface area, it means a composition with particles of sufficiently small size as to exhibit a Blaine specific surface area of greater than 8,000 $cm^2/g$. Generally, such compositions will exhibit a Blaine specific surface area between 8,000 and 20,000 $cm^2/g$, more generally, 10,000 to 15,000 $cm^2/g$. Stated in particle size, the microfine-ground material will generally have less than 1 wt % of the particles with a size greater than 16 microns in diameter and at least 1 wt % less than 1 micron in diameter, with greater than 50 wt % of the particles being between 2 and 6 microns in diameter.

By 'normally ground' as used herein is meant those slag compositions having a particle size such as to exhibit a Blaine specific surface area of less than 8,000 $cm^2/g$, generally 2,000 to 7,000 $cm^2/g$. Such compositions are generally made up of particles between 1 and 60 microns with greater than 50 wt % being between 4 and 20 microns. By microns is meant the particle diameter as determined by a MICROTRAC instrument as described in said Clarke '423 patent.

The term 'drilling fluid' as used herein means water-based fluids which contain water and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

The term "pipe" means either a casing or a liner.

The term "primary cementing" refers to any cementing operation where a cementitious slurry is passed into an annulus surrounding a pipe and thus, encompasses both the cementing of casings where the annulus is between the casing and the borehole wall and the cementing of liners where the annulus is between the liner and casing.

By "activator" is meant a material or materials which accelerate the setting of ground blast furnace slag.

The terms "universal fluid" is used herein to designate compositions comprising a drilling fluid and the blast furnace slag, which compositions are suitable for use as a drilling fluid, and which compositions thereafter for the purpose of practicing this invention, have additional cementitious material and/or an activator system added to give a cementitious slurry.

Utilities

The cementitious slurries made with the microfine ground/normally ground blast furnace slag compositions of this invention can be utilized wherever cementitious slurries are normally used including building construction, road building, marine applications, and grouting. They are of special value in primary cementing operations. Hence, the invention is described hereinbelow in terms of cementitious slurries for cementing operations. However, references to the use of various salt solutions and the concentrations of materials are all intended apply equally to cementitious slurries per se. And, indeed two can overlap. For instance, in utilities such as road construction a used drilling fluid can serve as the aggregate thus giving an inexpensive but high quality cement and solving a disposal problem that would have existed relative to the used drilling fluid.

Drilling Fluids

It is generally preferred that the drilling fluids use water containing dissolved salts, particularly sodium chloride. In these instances, 0.1 to 26, preferably 3 to 10 wt % sodium chloride may be used. In some instances a saturated solution under the conditions used might be employed. Various salts, preferably inorganic salts, are also suitable for use in the drilling fluid in addition to, or instead of, NaCl, including, but not limited to, NaBr, KCl, $CaCl_2$, $NaNO_3$, $NaC_2H_3O_2$, $KC_2H_3O_2$, $NaCHO_2$ and $KCHO_2$. Said drilling fluid may also contain, in addition, a mixed metal hydroxide.

The initial drilling fluid in the universal fluid embodiment generally contains the microfine ground/normally ground blast furnace slag in an amount within the range of 1 to 100 lbs/bbl of final drilling fluid, preferably 10 to 80 lbs/bbl, most preferably 20 to 50 lbs/bbl.

The drilling fluid may contain no activator since the fine particles of blast furnace slag which migrate into the formation will eventually harden due to the action of the water and salts present in the formation It may, however, have a small amount of activator so as to speed up the hardening. This can be accomplished without the drilling fluid setting up in the wellbore because the moving drilling fluid tends to harden more slowly. When used in the initial drilling fluid, the amount used will vary depending on the type of accelerator used. In the case of caustic soda and soda ash from 0.1 to 10 lbs/bbl of caustic soda, more preferably 0.1 to 2 lbs/bbl can be used in conjunction with 0.1 to 15 lbs/bbl, preferably 0.1 to 3 lbs/bbl of soda ash. The reference to 'lbs/bbl' of activator in the drilling fluid means pounds per barrel of total drilling fluid.

In the case of offshore wells, and particularly when drilling the surface portion of the borehole, drilling fluids based on sea water as the liquid phase are highly desirable. Thus, the drilling fluid will be compatible with the sea water present in the environment surrounding the borehole. Also, an unlimited supply of seawater is readily available.

To prevent fluid flow from water-bearing formations penetrated and to reduce the collapse of incompetent formations, the drilling fluid should have a sufficient density to give a hydrostatic pressure greater than that of the formation fluid. The pressure differential causes the drilling fluid to flow into the formation, carrying the blast furnace slag into the formation pores and building the filter cake. The drilling fluid density is increased by the addition of the blast furnace slag. If necessary, the density can be further increased by adding a soluble salt such as NaCl, $CaCl_2$, NaBr, $ZnBr_2$ or standard insoluble weighting materials such as ground barite.

The pressure differential also is increased by the circulation pressure (supplied by the mud pump) required to circulate the drilling fluid. This additional pressure will increase the flow rate of the microfine material into the formation but it also can increase the total pressure on the formation sufficiently to cause fracturing of a formation penetrated by the borehole. The fluid properties must be controlled so that the formation pressures are contained while the drilling fluid is static and the formations are not hydraulically fractured when the drilling fluid is circulated. In addition, the rheological properties of the drilling fluid can be controlled or modified by using any of many well known chemical dispersants for oil-in-water drilling fluids. The more common materials are the lignosulfonates commonly added to drilling fluid to control its rheological properties. Several lignosulfonates also serve to retard the setting time of the fluids. Such additives are discussed in detail in Hale and Cowan U.S. Pat. No. 5,058,679 issued on Oct. 22, 1991 and entitled "Solidification of Water-Based Muds". This patent is incorporated by reference in the present specification.

Cementing

After the wellbore is drilled and a casing inserted, a compatible cementitious slurry is used to cement the casing. This cementitious slurry can contain the microfine-ground/normally-ground blast furnace slag blend in an amount sufficient to give 20 to 600 lbs/bbl, preferably 100 to 500 lbs/bbl, most preferably 150 to 350 lbs/bbl of total ground blast furnace slag in the cementitious slurry, i.e., pounds based on one barrel of the final cementitious slurry.

While the drilling fluid could be disposed of in a normal manner and a cementitious slurry made up from new ingredients, it is preferred to simply add the microfine-ground/normally-ground blast furnace slag blend and activators to the used drilling fluid produced during the course of the drilling, thus any blast furnace slag from the drilling fluid not migrating into the pores of the formation or otherwise lost is incorporated into the final cementitious slurry.

Suitable activators for the blast furnace slag include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium sulfate, calcium nitrate, calcium nitrite, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel of final cementitious slurry. The amounts referred to hereinabove are the amounts actually added to the cementitious slurry. If some activator was included in the drilling fluid, that amount can generally be disregarded when calculating the amount to use in the cementitious slurry unless the amount used was toward the upper range disclosed in which case some compensation could be made by way of reducing the accelerator in the final cementitious slurry from the amounts described hereinabove.

When drilling the initial section of the borehole, drilling fluid may not be returned to the drilling operation in which case, of course, the cementitious slurry would be made up with all new ingredients for cementing the first section of the casing.

Also, the drilling can be carried out with a drilling fluid which contains no cementitious material or which contains normally ground blast furnace slag.

Universal Fluid Cementing

After the casing or liner is lowered into the well, it is cemented in place using a slurry made by adding additional blast furnace slag to the drilling mud. Since the drilling mud already contains and is compatible with the hydraulic material used in the present invention, i.e., blast furnace slag, it is possible to add the material with additional activators directly to the drilling fluid to produce a cementitious slurry which will set much quicker and which will be much harder and stronger than would the drilling fluid without the additional materials. The resulting cementitious slurry then can be pumped down the pipe which suspends the casing in the wellbore drilled in the seafloor. It then flows into the annular space between the casing and the borehole walls displacing the drilling fluid that was in the borehole Alternatively, it can be introduced directly into the annulus between the casing and the walls of the wellbore.

Since the cementing slurry is compatible with the drilling fluid present in the annular space, there is no need to displace the drilling fluid from the annular space using a special spacer fluid as is required when Portland cements are used. Likewise, the slurry is compatible with the hardening mud filter cake which is formed by the drilling fluid on the incompetent formations penetrated by the borehole. Since both the mudcake and the cementing fluid contain the same hydraulic material, they are fully compatible. Thus, the mudcake on the water-bearing sands or other incompetent formation can remain in place and need not be removed when cementing the casing in place.

Filter Cake Setting

In yet another embodiment of this invention the drilling process is carried out as described hereinabove with a universal fluid containing the microfine-ground/normally-ground blast furnace slag blend to produce a borehole through a plurality of strata, thus laying down a filter cake. Prior to the cementing operation, an activator is passed into contact with the filter cake, for instance by circulating the activator down the drill string and up the annulus between the drill string and the filter cake, or else the drill string is removed and the casing inserted and the activator circulated down the casing and up the annulus. As used herein 'down' as it relates to a drill string or casing means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drilling fluid is then diluted, if necessary, the drill string removed, and the cementing carried out as described hereinabove. The hardening of the drilling fluid filter cake prior to cementing can be accomplished by circulating a separate fluid containing the activator or by adding an activator such as an alkali as described hereinabove to the drilling fluid.

Conventional spacers may be used in the above described sequence. Also, any leftover fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate.

Slag Sources

A blast furnace slag with a Blaine surface area of about 5500 is sold under the tradename "NEWCEM" by Blue Circle Cement Co. A small particle size blast furnace slag is also sold by the Blue Circle Cement Co. Another source is Geochem which sells a material with a Blaine-specific surface area of about 11,000 under the tradename "MICROFINE MC 100" and Koch Minerals of Wichita, Kans. which sells a material with a blaine specific surface area of about 10,000 under the tradename "WELL-CEM".

In addition, any normally ground blast furnace slag can be divided into two aliquots and one portion thereof further ground the microfine range and then regrind with the normally ground blast furnace slag.

EXAMPLE

Mixtures of microfine and ultrafine blast furnace slags with normal fineness blast furnace slags were prepared to evaluate setting time, rheological properties and density ranges. Three microfine slags were used: MC-100 from Geochem Corporation having a Blaine-specific surface area of about 11,000 $cm^2$/gram; and two slag samples from Koch Minerals, Wichita, Kans., having Blaine-specific surface areas of about 10,500 and 14,000 $cm^2$/gram.

The mixtures of slags evaluated ranged from 25 wt % to 75 wt % microfine slag in the mix with the remainder of the blend made up with a normal fineness blast furnace slag. The normal fineness slag was NEWCEM marketed by Blue Circle Cement Company. It had a Blaine-specific surface area of about 5,500.

Blends of microfine slag and normal fineness slag generally got higher strength that normal fineness slag at the same water to solids ratio. Additionally, because of the higher surface area of the microfine slags, higher water to solids ratios are possible while still providing good compressive strength. The higher water to solids ratios provide lower density slurries which is beneficial for cementing across weak formations which may rupture or fracture in the presence of the hydrostatic pressure loads applied with higher density slurries. Thus, high strength, lower density slurries can be formulated. Additionally, this can be done at a lower cost than using microfine slags or cements alone.

While this invention has been described in detail for the purpose of illustration, it is not to be construed as limited thereby but is intended to cover all changes and modifications within the spirit of the scope thereof.

What is claimed is:

1. A method for drilling and cementing a well comprising:
   combining a drilling fluid and a blend of microfine ground blast furnace slag and normally ground blast furnace slag to produce a universal fluid;
   thereafter utilizing said universal fluid in a well drilling operation to form a borehole, thus producing a used universal fluid;
   thereafter combining an additional amount of a blend of microfine ground blast furnace slag and normally ground blast furnace slag, and an activator with said used universal fluid;
   disposing a pipe in said borehole;
   passing said cementitious slurry down said pipe and up into an annulus formed by said borehole and said pipe.

2. A method according to claim 1 wherein each of said blends is made using 5–48 wt % microfine ground blast furnace slag based on the total weight of the blend.

3. A method according to claim 1 wherein each of said blends is made using 5–25 wt % of said microfine ground blast furnace slag based on the total weight of said blend.

4. A method according to claim 3 wherein said microfine ground blast furnace slag has less than 1% by weight of particles with a size greater than 16 microns in diameter and at least 1% by weight less than 1 micron in diameter with greater than 50% of the particles being between 2 and 6 microns in diameter.

5. A method according to claim 4 wherein said normally ground blast furnace slag has greater than 50 wt % of the particles with a size between 4 and 20 microns in diameter.

6. A method according to claim 1 wherein said microfine ground blast furnace slag has less than 1% of the particles with a size greater than 16 microns in diameter and at least 1% by weight of particles of less than 1 micron in diameter with greater than 50% of the particles being between 2 and 6 microns in diameter.

7. A method according to claim 6 wherein said normally ground blast furnace slag has greater than 50 wt % of the particles with a size between 4 and 20 microns in diameter.

8. A method according to claim 1 wherein said water of said drilling fluid contains dissolved salts.

9. A method according to claim 1 wherein said drilling fluid contains, in addition, a mixed metal hydroxide.

10. A method for drilling and cementing a well, comprising:
   (a) utilizing a blast furnace slag-containing drilling fluid in a well drilling operation to form a borehole with drill string having a hollow pipe, thus laying down a filter cake on walls of said borehole,
   (b) passing an activator-containing fluid down said hollow pipe and up into contact with said filter cake, to cause said filter cake to harden
   (c) displacing said activator-containing fluid with a drilling fluid and continuing said drilling operation thus producing a used drilling fluid,
   (d) removing said drill string and inserting a casing,
   (e) combining an activator system and a blend of minor amount of microfine ground blast furnace slag and a major amount of normally ground blast furnace slag with said used drilling fluid thus producing a cementitious slurry, and
   (f) passing said cementitious slurry down said casing and up into an annulus surrounding said casing.

11. A method of claim 10 wherein said blend contains 5–49 wt % microfine ground blast furnace slag based on the total weight of said blend.

12. A method according to claim 10 wherein said blend is combined with said drilling fluid in an amount sufficient to give 10–80 lbs per barrel of said blend based on the total weight of said universal fluid.

13. A method according to claim 12 wherein said cementitious slurry contains 100–500 lbs per barrel of said blend.

14. A method according to claim 13 wherein said activator is a mixture of 2–6 lbs per barrel of caustic soda and 2–20 lbs per barrel of soda ash.

* * * * *